May 25, 1965 M. E. SIKORSKI 3,184,972

PRESSURE TRANSDUCERS

Filed April 24, 1961

INVENTOR
M. E. SIKORSKI
BY George S. Indig
ATTORNEY

United States Patent Office 3,184,972
Patented May 25, 1965

3,184,972
PRESSURE TRANSDUCERS

Mathew E. Sikorski, New Providence, N.J., assignor to Bell Telephone Laboratories, Incorporated, New York, N.Y., a corporation of New York Filed Apr. 24, 1961, Ser. No. 104,994
7 Claims. (Cl. 73—398)

This invention relates to pressure transducers. More particularly it concerns pressure transducers which include a semiconductor diode having a pressure sensitive junction and additional specific characteristics which enable the transducer to provide extreme sensitivities over wide ranges of pressure.

Certain semiconductor junctions exhibit a high degree of sensitivity to pressure variations and hence, are well adapted for use as pressure transducers. One of the best junction devices of this category is a tunnel diode. Also, sensitive pressure responsive characteristics have been observed with backward diodes and to a lesser extent with ordinary p-n junctions. This invention requires the use of any pressure sensitive p-n junction capable of providing the peculiar characteristics hereinafter defined. The preferred form of diode for this invention is a tunnel diode. Accordingly, the following description is largely in terms of tunnel diodes.

Tunnel diodes are known to exhibit a high degree of sensitivity to pressure variations and hence, are particularly well adapted for use in this invention. This is disclosed in United States Patent No. 3,065,636, issued November 27, 1962. This application describes the resistance variation of a tunnel diode, responsive to pressure, as measured at an arbitrary point in the switching mode of the I–V characteristic.

It has now been found that by varying the I–V characteristic according to prescribed conditions and by operating the tunnel diode in the amplifier mode rather than the switching mode surprising and unexpected sensitivities are obtained. For instance, in the patent referred to above, the calculated gage factor for a typical device operating in the switching mode based upon the experimental values obtained was 110. For gage devices constructed according to the teachings of the present invention, gage factors as high as 29,800 have been observed. Such gages are clearly among the most sensitive testing devices known.

Tunnel diodes are relatively new in the art. A definition and complete treatment of their characteristics is in the literature. See, for example, "New Phenomon in Narrow Germanium P–N Junctions," by L. Esaki, Physical Review, vol. 109, Jan.-Mar. 1958, pages 603–604; "Tunnel Diodes as High-Frequency Devices," by H. S. Sommers, Jr., Proceedings of the I.R.E., vol. 47, July 1959, pages 1201–1206; and "High-Frequency Negative-Resistance Circuit Principles for Esaki Diode Applications," by M. E. Hines, The Bell System Technical Journal, vol. 39, May 1960, pages 477-513.

Tunnel diodes in general are characterized in that their predominant current carrying mechanism is by internal field emission. This is manifested by the presence of a negative resistance region in the normal I–V characteristic of the diode. These diodes offer many advantages such as their small size, ruggedness, relative low cost and low noise properties. Of particular concern to their application as pressure transducers is the extreme sensitivity of the tunnel current-carrying mechanism to variations in pressure.

In order to achieve the extreme sensitivities which are characteristic of the devices of this invention, the I–V characteristic must be modified in a specified manner so as to obtain a relatively flat horizontal (constant current) or vertical (constant voltage) portion in the characteristic. This portion corresponds to the negative resistance region of the curve and reflects extreme pressure sensitivity. Operating the tunnel diode gage at a constant current value or a constant voltage value corresponding approximately to the flat portion results in a large electrical variation in response to a relatively small pressure variation.

These and other characteristics of this invention will be more readily understood from the following detailed description considered in connection with the accompanying drawing in which.

Figure 1:
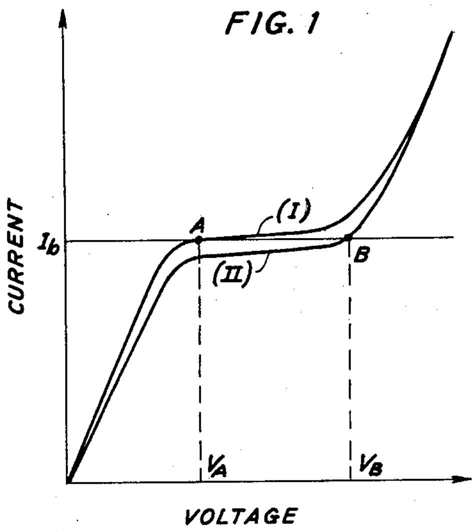
FIG. 1 is a plot of current vs. voltage for a diode having a characteristic which meets the requirements of this invention.

FIG. 1 shows two diode characteristics, current plotted vs. voltage, each under a different applied pressure. Curve I is a current-voltage characteristic corresponding to atmospheric pressure and curve II to a characteristic for the same diode at an elevated pressure. Using a constant current bias at $I_b$, the voltage swing responsive to this pressure variation, corresponding to the translation of the operating point from point A to point B, is $V_B-V_A$. This illustrates the surprising advantage of such a characteristic as opposed to I–V characteristics ordinarily available.

Figure 3:
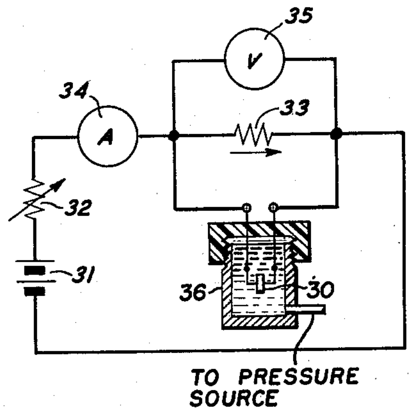
FIG. 3 is a schematic circuit diagram showing one means of obtaining the desired I–V characteristic of FIG. 1.
Figure 2:
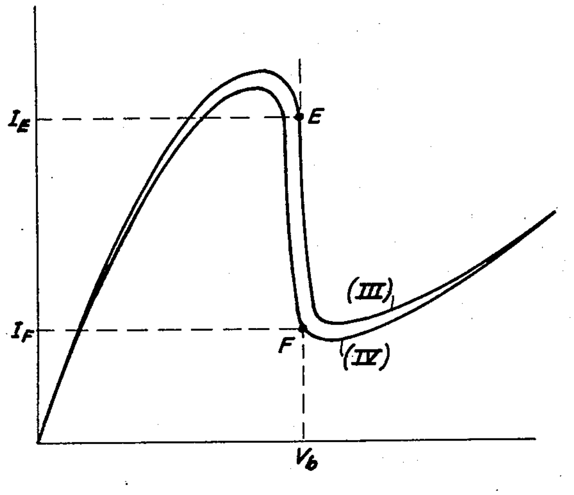
FIG. 2 is a plot of current vs. voltage for a modified diode characteristic also within the scope of this invention.

FIG. 2 shows the same phenomenon except that the bias is at constant voltage and the pressure variation response is a current variation. Here again, two characteristics are shown with current plotted versus voltage, curve III at atmospheric pressure and curve IV at an elevated pressure. Using constant voltage bias at $V_b$ the operating point translates from E at normal pressure to F at elevated pressure. The current response to this variation is $I_E-I_F$. Such a characteristic exhibiting a constant voltage portion is obtained in a manner similar to that illustrated by FIG. 4 except that the voltages must be added to obtain the flat portion EF (FIG. 2) rather than the currents. To obtain this the resistor 33 of the circuit of FIG. 3 is connected in series with the diode rather than in parallel.

These two figures illustrate the type of I–V characteristic upon which this invention relies. Any such similar characteristic which exhibits an essentially flat portion approximately parallel to either axis, when used according to the teachings of this invention, will provide the advantages and unexpected results as stated herein.

Various alternatives are available to those skilled in the art to obtain the desired characteristic. For instance, semiconductor diodes inherently providing for such a characteristic may be built. In this category are the so-called backward diodes. Recent studies have indicated that ordinary tunnel diodes, previously irradiated, will provide this characteristic. See for example, J. W. Easley and R. R. Blair, Journal of Applied Physics, 31, No. 10 (October 1960).

However, a preferred embodiment, which provides extreme sensitivity coupled with adjustability, involves the use of an ordinary tunnel diode in combination with circuit means for obtaining the desired characteristic.

FIG. 3 illustrates a schematic circuit diagram for obtaining a characteristic similar to that of FIG. 1, using an ordinary tunnel diode. In this arrangement the tunnel diode is connected to power source 31 through a variable resistor 32 which is included to provide an adjustable feature as will be hereinafter explained. The power source 31 is adapted to deliver a constant current. Shunt resistor 33 is connected in parallel with the diode 30. The ammeter 34 and voltmeter 35 are connected as shown to provide a measure of the voltage variation across the diode 30 in response to the applied pressure and to measure the constant current value. The pressure is applied by the hydrostatic pressure vessel 36.

To obtain an I–V characteristic similar to that of FIG. 1 the value of the shunt resistance should preferably approximate the value of the negative resistance of the diode. This requirement will become evident from an examination of FIG. 4 in which curve X illustrates the I–V characteristic for the diode, line Y is the straight line characteristic of the shunt resistor, and curve Z is the overall characteristic of the circuit. As seen, the combination of curve X and line Y, obtained by adding the current values such as $I_1+I_2=I_3$, results in an overall curve Z having the desired characteristic. From this illustration it is apparent that the voltage range of the desired flat portion of the curve *a′–b′* is coextensive with the voltage range of the negative resistance region of the diode *a–b*. The desired operating point is on this portion *a′–b′*. Most important, however, is the fact that for the portion *a′–b′* to be essentially horizontal, the portion *a–b* and the line representing the shunt resistor must have approximately equal and opposite slopes. To obtain this result the negative resistance of the diode and the shunt resistor are preferably approximately equal.

Experimental evidence with silicon tunnel diodes indicates that these resistance values should not deviate from equality by more than 10%. However, other diodes such as G*a*A*s* and G*a*P are more sensitive to pressure and a greater deviation can be tolerated while still providing the high gage factors characteristic of this invention. While, even in these cases, equality of these resistor values provides optimum gage factors and ±10% deviation would represent a desirable operating range, good results, i.e., gage factors in excess of 1000, may be obtained with deviations as high as 50%.

Figure 4:
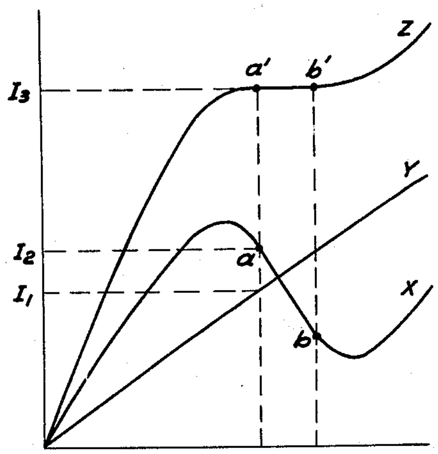
FIG. 4 is a plot of current versus voltage showing the characteristic of the circuit of FIG. 3 and further including curves for the tunnel diode and the shunt resistor alone.

In the manner similar to the modification illustrated by FIGS. 3 and 4 the tunnel diode characteristic may be modified to obtain the characteristic of FIG. 2. This involves the use of a resistor in series with the tunnel diode having a resistance value of the same general order as in the previous case. Again, the deviation between the resistor values should not exceed 50% and preferably should not exceed 10%.

The following examples are included to show typical operating conditions and resulting gage factors obtained with various pressure variations.

EXAMPLE I

A silicon tunnel diode was connected in the circuit of FIG. 3 in parallel with a resistance of 340 ohms. The negative resistance of this diode was approximately 344 ohms. The current value and voltage were 0.880 milliampere and 0.1187 volt respectively. This current value with this diode corresponded approximately to the value $I_3$ on FIG. 4. The diode was then subjected to a pressure variation from atmospheric pressure to 60 p.s.i. by means of an ordinary pressure bomb of the character well known in the art. The voltage value at the elevated pressure read 0.1035 volt.

EXAMPLE II

The same procedure was followed as in Example I except the shunt resistor value was 337 ohms, the constant current value was 0.881 ma. and the initial voltage was 0.1185 volt. A pressure 220 p.s.i. was applied whereupon the voltage reading became 0.1078 volt.

EXAMPLE III

The procedure of the previous examples was followed with a shunt resistor value of 335 ohms, a constant current value of 0.875 ma. and an initial voltage reading of 0.1181 volt. The pressure range was 0–500 p.s.i. with a voltage reading at the elevated pressure of 0.1045 volt.

EXAMPLE IV

In this example the shunt resistance value was 330 ohms, the constant current value 0.890 ma. and the initial voltage at atmospheric pressure of 0.1197. Upon the application of 1000 p.s.i., the voltage reading was 0.1035 volt.

In all these examples voltage values taken intermediate the two extremes given indicated a linear variation of voltage with pressure over the range involved.

The following table summarizes the data obtained in each example and additionally includes the calculated gage factors for each example.

*Table I*

| Example | $V_{po}$ (volts) | $V_p$ (volts) | ΔV (volts) | Δp (p.s.i.) | $S_p=\Delta V/V/\Delta p$ v./v./p.s.i. | G.F. $=S_p x E_B$ |
|---|---|---|---|---|---|---|
| I | 0.1187 | 0.1035 | 0.0152 | 60 | $2.1\times10^{-3}$ | 29,800 |
| II | 0.1185 | 0.1078 | 0.0107 | 220 | $4.1\times10^{-4}$ | 5,820 |
| III | 0.1181 | 0.1045 | 0.0136 | 500 | $2.3\times10^{-4}$ | 3,260 |
| IV | 0.1197 | 0.1035 | 0.0162 | 1,000 | $1.4\times10^{-4}$ | 1,990 |

where $V_{po}$—voltage across the diode at atmospheric pressure
$V_p$—voltage across the diode at elevated pressure
ΔV—change in voltage
Δ*p*—pressure change
$S_p$—relative change of voltage per unit of pressure
G.F.—gauge factor
$E_B$—bulk modulus of elasticity for silicon ($E_B=14.2\times10^6$ p.s.i.)

These results illustrate the extremely high gage factors obtainable with this invention. From Examples I–IV and Table I it is seen that the gage factors continuously decreased over increasing pressure ranges as the value of the shunt resistor deviated from the negative resistance value of 344 ohms. This data illustrates that the highest gage factors are obtainable over a narrow pressure range. If a large pressure variation is involved in the desired measurement, the gage is adjusted with the shunt resistor to provide a constant gage factor over that range. If small pressure ranges are encountered the shunt resistor can be adjusted to provide the extremely high gage factors over that range. To adjust the sensitive response of the gage to a different pressure range, the series resistor 32 in FIG. 3 is varied. For instance, Example I shows a gage factor of 29,800 over the pressure range 0–50 p.s.i. If the pressure variations being measured are in the vicinity of 1000 p.s.i. the series resistor 32 is adjusted so that the sensitive voltage response occurs at the desired pressure. This feature combines a sensitivity and adjustability unmatched by any known prior art transducer.

The negative resistance value of the diode as referred to in this specification is the value corresponding to the slope of the negative resistance region of the diode, i.e., the amplifier mode, appearing in its I–V characteristic. While most tunnel diodes have a negative resistance region which is straight enough to leave little doubt as to the approximate negative resistance value, where a significant curvature in the negative resistance portion of the I–V characteristic is encountered the value intended by this description is the resistance value corresponding to the slope of the curve at the point of inflection in the negative resistance portion of the curve.

It is to be understood that the p-n junctions referred to herein are sensitive to both directional and hydrostatic pressure variations. Thus, the term pressure as used in this specification and in the appended claims is intended to define both directional and hydrostatic pressure.

Various modifications and extensions of this invention as described in this specification will become apparent to those skilled in the art. All such variations and deviations which basically rely upon the fundamental concepts by which this invention has advanced the art are properly considered as within the scope of this invention.

What is claimed is:

1. A pressure transducer comprising a diode means having a pressure responsive p-n junction, said diode means exhibiting a current-voltage characteristic a portion of which is essentially parallel to one of the axes of the characteristic, means for applying an electrical bias to the diode means with a load line approximately parallel to said one of the axes and intersecting said portion, means for subjecting the junction of said diode means to variations in pressure and means for measuring the electrical response of said diode means to the pressure variations.

2. The device of claim 1 wherein the essentially parallel portion is parallel to the voltage axis, and the biasing means is a constant current bias whereby the electrical response of the diode is a variation in voltage.

3. The device of claim 1 wherein the said diode means includes a tunnel diode.

4. A pressure transducer comprising in combination a tunnel diode having a negative resistance region and a resistor electrically connected in parallel therewith, said resistor having a resistance value in the range of at least 0.5 times the negative resistance value of said diode, means for electrically biasing the said combination at a constant current value in the portion of the I–V characteristic of the said combination over the voltage range of the said negative resistance region, means for subjecting the junction of said diode to variations in pressure and means for measuring the electrical response of said combination to the pressure variations.

5. The device of claim 4 wherein the said parallel resistor is adjustable to permit adjustment of the degree of electrical response of said combination to said pressure variations.

6. The device of claim 4 additionally including an adjustable resistor in series with said combination to permit adjustment of the combination to provide a sensitive electrical response over a desired pressure range.

7. The device of claim 4 wherein the said resistor has a resistance value which is essentially equal to the value of the negative resistance.

References Cited by the Examiner

UNITED STATES PATENTS 2,614,140 10/52 Kreer -------------- 307—88.5

OTHER REFERENCES

Esaki et al.: "A New Device Using the Tunneling Process in Narrow p-n Junctions," Solid State Electronics, vol. 1, March 1960, pages 13, 14 and 15.

Miller et al.: "Pressure Dependence of the Current-Voltage Characteristics of Esaki Diodes," Physical Review Letters, vol. 4, No. 2, Jan. 15, 1960, pages 60, 61 and 62.

RICHARD C. QUEISSER, *Primary Examiner.*

ROBERT L. EVANS, DAVID SCHONBERG, JOSEPH P. STRIZAK, *Examiners.*